J. C. REED.
SYSTEM OF ELECTRIC MOTOR CONTROL.
APPLICATION FILED JAN. 4, 1913.
1,060,941.
Patented May 6, 1913.
2 SHEETS—SHEET 1.
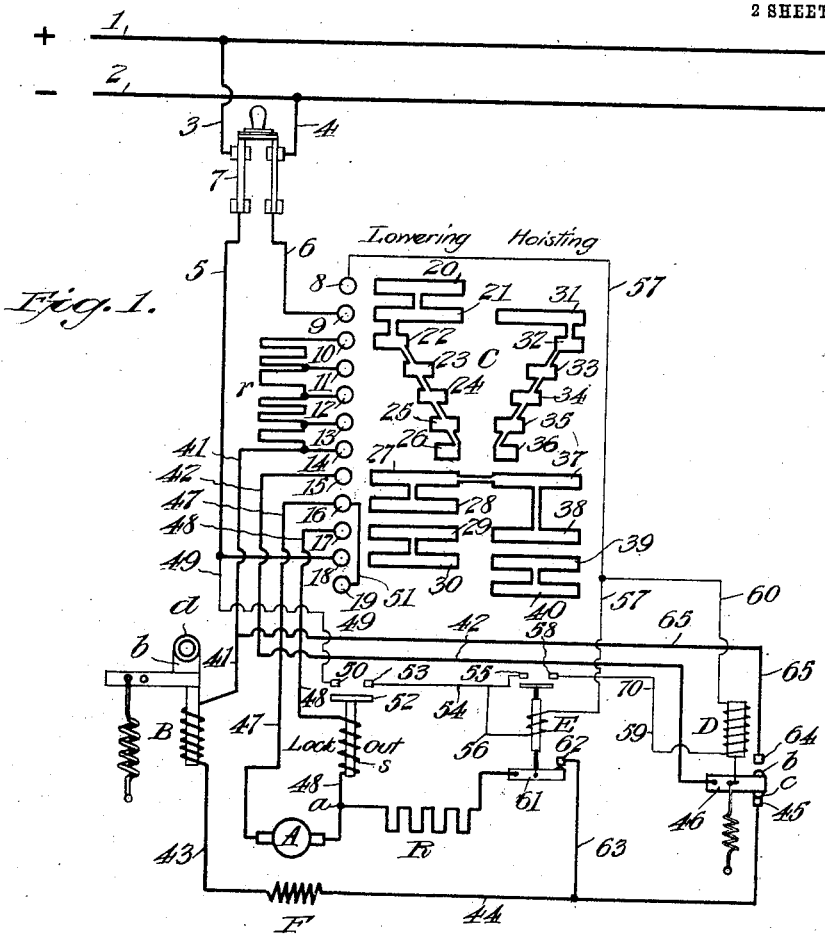
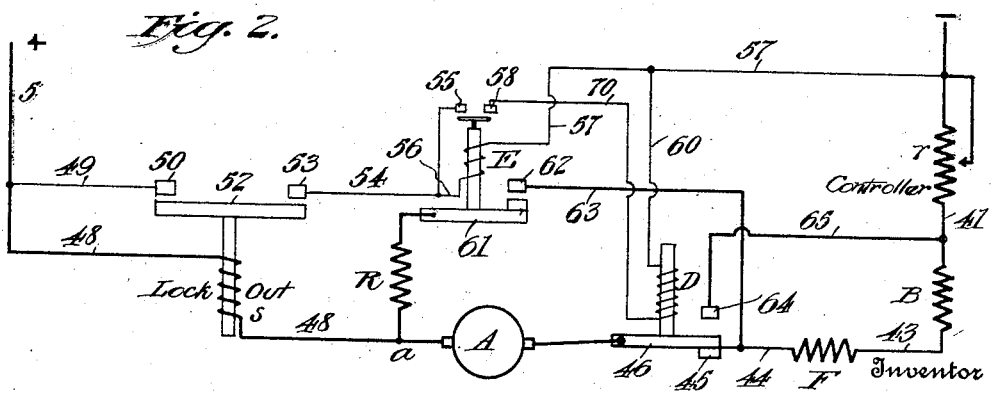

J. C. REED.
SYSTEM OF ELECTRIC MOTOR CONTROL.
APPLICATION FILED JAN. 4, 1913.
1,060,941.
Patented May 6, 1913.
2 SHEETS—SHEET 2.
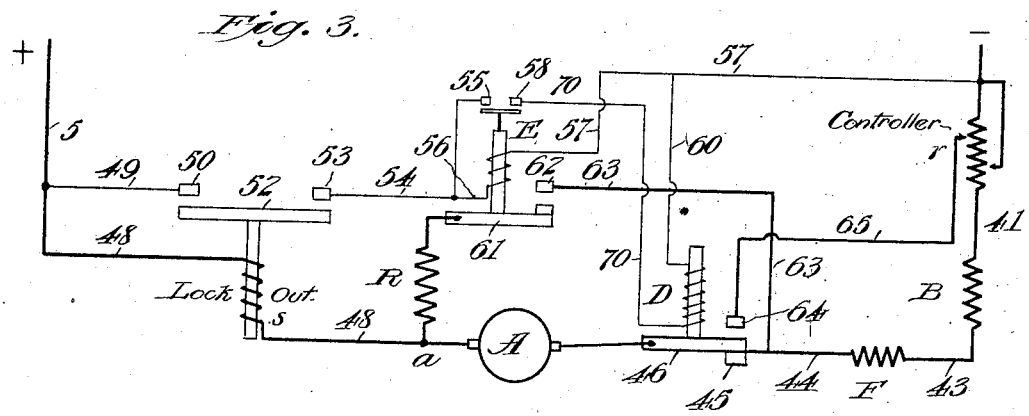
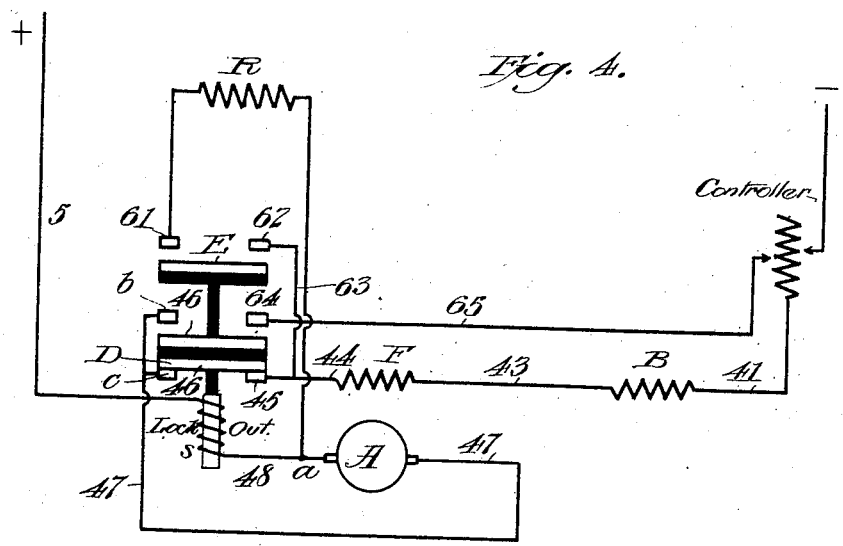

UNITED STATES PATENT OFFICE.

JOHN C. REED, OF STEELTON, PENNSYLVANIA.

SYSTEM OF ELECTRIC-MOTOR CONTROL.

1,060,941.  Specification of Letters Patent.  Patented May 6, 1913.

Application filed January 4, 1913. Serial No. 740,160.

*To all whom it may concern:*

Be it known that I, JOHN C. REED, a citizen of the United States, residing in the borough of Steelton, county of Dauphin, and State of Pennsylvania, have invented certain new and useful Improvements in Systems of Electric-Motor Control; and I do hereby declare the following to be a full, clear, and exact description of the invention, such as will enable others skilled in the art to which it appertains to make and use the same, reference being had to the accompanying drawings, and to letters or figures of reference marked thereon, which form a part of this specification.

My invention relates to control systems for series wound electric motors of electrically driven machines of various types, such as those for operating hoists, street cars, motor vehicles, cranes and other machines where it is desirable to have a simple and efficient motor control, and where the electric motor is automatically prevented from assuming dangerous speeds, which often occurs when the vigilance of the operator has been relaxed, or prevented from any cause.

Experiments which I have made with various types of electrically driven machinery such as are used in and around large steel working plants, and to which my invention has been applied, give highly satisfactory results.

In order that my invention may be clearly understood, I have illustrated, as an example, the system of control in connection with an electric motor operated crane, having selected this type of machine for illustration for the reason that it operates under great variations of load.

Referring to the drawings which diagrammatically illustrate my invention, and in which like parts are similarly designated—Figure 1 is a diagrammatic illustration of the system of electric control applied to a crane operated by a series wound motor. Fig. 2 is a simplified diagram of Fig. 1, omitting the details of the controller. Fig. 3 is a modification of the diagram Fig. 2, showing the manner of varying controller resistance in the dynamic braking circuit. Fig. 4 is a diagram of a further modification, wherein the controlling switches are combined with lock-out switch, and thereby decrease the number of moving parts and shorten the wiring.

Referring to Fig. 1 illustrating a series wound motor of an electric crane and its manually operated controller, 1 and 2 are the supply mains from which are branched taps 3 and 4, to which the controller wires 5 and 6 are connected by a suitable switch 7. C represents a well known type of reversing controller, the general structure of which forms no part of my invention. This controller comprises a number of stationary contacts 8—19, and two sets of movable or wiper contacts manually operated to control the crane under all conditions of operation at the will of the operator. One of these sets of movable contacts for lowering the load comprises the contacts 20 to 30, of which 20 to 26 are electrically connected by connectors; 27 and 28 are likewise electrically connected, as are 29 and 30. The other set of movable contacts is used when raising or hoisting a load, and comprises contacts 31 to 40, of which 31 to 36 are electrically connected by suitable connectors; 37 and 38 likewise connected, as are also 39 and 40. The contact 27 of one set is also electrically connected with the contact 37 of the other set, as shown. The movable contacts 22 to 26 and 32 to 36 coöperate with the stationary contacts 10 to 14 to place resistance $r$ in the motor circuit, said resistance being connected to the stationary contacts 10—14, as indicated. Wire 6 is connected to stationary controller contact 9. Stationary controller contacts 14 and 15 are connected to wires 41 and 42, effecting a wire connection through a winding B of an electro-magnetic brake $b$ for the hoisting drum $d$ a wire 43, field winding F of the motor, wire 44, a contact 45 of a solenoid switch D whose movable contact is connected to wire 42. Stationary controller contacts 16 and 17 are connected, respectively, to wires 47 and 48 of the armature A of the motor. The stationary controller contact 18 is connected to supply wire 5, and by a wire 49 to a contact 50 of a lock-out switch and in a control circuit. Stationary controller contact 19 is connected by wire 51 to stationary controller contact 16. In series with the armature is a winding or coil $s$ that operates a circuit closer 52 of any suitable type of solenoid switch or relay arranged to lock out when currents in excess of a certain value pass through its winding $s$ and to close when the current has decreased to said value. Preferably this switch is of that type which may be adjusted to close upon any desired drop of current. This type of switch is well known, and its specific structure is not herein claimed, as I may use any other form of circuit closing mechanism that is dependent for its operation on the speed of rotation of the rotor or armature of an electric motor, but I prefer the one illustrated, as it has proven highly satisfactory, its operation being positive and reliable by reason of being controlled by the current through the armature. The lock-out switch 52, or equivalent mechanism, bridges contacts 50, 53 upon a predetermined excess of current passing through winding $s$. Contact 53 is connected by wire 54 to a contact 55. Branching from wire 54 is a wire 56 connected to the winding of a solenoid switch E, which is connected to the return wire 57 of the control circuit that terminates at stationary controller contact 8. Solenoid switch E bridges contact 55 to a contact 58 that is connected by a wire 59 to the winding of solenoid switch D that is connected by wire 60 to return wire 57. The solenoid switches E and D are in parallel in the control circuit, the switch D operating after the switch E has bridged contacts 55 and 58. Between the armature A and the lock-out switch I connect one end of a resistance whose other end is connected to the movable conductive member 61 operated by the solenoid switch E. The member 61 is moved when the solenoid switch E is operated into contact with contact 62 that is connected by wire 63 to wire 44. In other words, the lock-out switch $s$ operates upon a predetermined drop of current through the armature to close the control circuit and operate the solenoid switch E which places momentarily the resistance R and armature A in parallel and both in series with the field. Immediately after the insertion of the resistance, solenoid switch D operates to move its conductive member 46 from contact 45 against an opposite contact 64 connected by wire 65 and is connected to wire 41. This switch establishes a local or dynamic braking circuit containing the armature A, resistance R and field winding F in series.

The operation is as follows: Upon lowering a load, current passes from supply main 1, tap 3, switch 7, wire 5, stationary controller contact 18, movable controller contacts 30 and 29, stationary controller contact 17, wire 48, lock-out switch winding $s$ to armature A, thence by wire 47 to stationary controller contact 16, movable controller contacts 28 and 27, stationary controller contact 15, wire 42, switch member 46 of solenoid switch D, contact 45, wire 44, series field F; wire 43, brake winding B, wire 41, controller resistance $r$ and contact 10, movable controller contacts 22 and 21, stationary contact 9, wire 6, switch 7, tap 4 to supply main 2. Moving the controller cuts out successive portions of the resistance $r$ until the movable contact 26 is on stationary contact 14, when all the resistance is cut out. The motor will then speed up, and since the load is descending, the motor will have little work to do and will accelerate rapidly until a safe maximum speed will have been attained, when, by reason of the drop of current, the lock-out switch will operate to close the control circuit as follows: The conducting element 52 of the lock-out switch will bridge the contacts 50 and 53 when the current has dropped to the predetermined point at which the lock-out switch has been set. Current will then pass to the control circuit as follows: supply main 1, tap 3, switch 7, wires 5 and 49, contact 50, switch member 52, contact 53, wire 54, contact 55, and branch wire 56, winding of solenoid switch E, wire 57, stationary controller contact 8, movable controller contacts 20 and 21, stationary controller contact 9, wire 6, switch 7, tap 4 and main 2. This causes solenoid switch E to close, closing contacts 61 and 62, and bridging contacts 55 and 58. The closing of contacts 61 and 62 completes a by-pass circuit around armature A and strengthens the field F, and this increase of strength in the field will cause the counter E. M. F. to be raised higher than the impressed E. M. F. of the mains. The bridging of contacts 55 and 58 causes control current to pass from 58, wire 70, winding of solenoid switch D, wires 60 and 57, contacts 8, 20, 21 and 9, wire 6 switch 7 and tap 4 to main 2. This operates switch D and closes contact at 46 and 64 to establish the following circuit: from main 1 to tap 3, switch 7, wire 5, stationary controller contact 18, movable controller contacts 30 and 29, stationary controller contact 17, wire 48, winding $s$ to connection $a$ where the current divides, one part passing through armature A, wire 47, controller contacts 16, 28, 27, 15, wire 42, switch arm 46 of switch D, contact 64, wires 65 and 41 back to main 2, as before described. The other part of the current passes through resistance R switch arm 61, contact 62, wires 63 and 44, field F, wire 43, brake winding B, wire 41 and back to main 2. It will be seen that whereas the field F and armature A were originally connected in series, that since the operation of the lock-out switch, the resistance R has been placed in series with the field F and the brake winding B, and that the armature A is in parallel, with the three latter in series. Owing to the increased strength of the field due to the circuit through the resistance R a counter E. M. F. in excess of the impressed E. M. F. is generated in armature A, and as a result of this a reverse current will pass through a dynamic braking circuit as follows: from armature A, resistance R, switch member 61, contact 62, wires 63 and 44, field F, wire 43, brake winding B, wires 41 and 65, contact 64, solenoid switch member 46, wire 42, controller contacts 15, 27, 28 and 16, and wire 47 back to the other side of armature A. This current will maintain the field F and the armature will therefore continue to generate power, so long as the load is descending and driving the armature. When the controller is turned to hoist the load, the direction of current through the armature is reversed from that described.

In Fig. 2 I have shown a diagram much simpler than Fig. 1, representing the same conditions and circuits, and in which the several parts are designated by like reference characters.

Fig. 3 is a modification of Figs. 1 and 2, wherein wire 65 is arranged to be variably connected with the controller resistance $r$ to vary the resistance of the dynamic braking circuit.

In Fig. 1 the arm 46 of switch D is shown as having contact points $b$ and $c$ on opposite sides, and instead of these points being movable, they may be stationary and the switches D and E and the lock-out switch may be combined into a single switch actuated by windings $s$ of the lock-out switch, thus dispensing with a long control circuit. Such a structure is diagrammatically illustrated in Fig. 4, which in other respects represents the same circuits as Figs. 1, 2 and 3, and effects the same dynamic control.

I claim:

1. In a motor control system, a motor having a rotor and a stator, means to supply current to the rotor and stator in series and means dependent upon the speed of the rotor to automatically connect the rotor and stator in parallel.

2. In a motor control system, a motor having an armature and a field and means to supply current to the armature and field in series, and means operated by a drop of current through the armature to automatically connect the armature and field in parallel.

3. In a motor control system, a motor having a rotor and a stator, means to supply current to the rotor and stator in series and electrical means dependent upon the speed of the rotor to automatically connect the rotor and stator in parallel.

4. In a motor control system, a motor having a rotor and a stator, means to supply current to the rotor and stator in series, an electrical resistance, and means dependent upon the speed of the rotor to automatically connect the rotor and stator in parallel, and simultaneously establish a local circuit containing said resistance rotor and stator in series and through which local circuit passes a counter current generated by the motor upon the assumption of the increased speed of the rotor.

5. In a motor control system, a motor having a rotatable armature and a stationary field, means to supply current to said armature and field in series, an electrical resistance and electrical means dependent upon the speed of the armature to automatically connect said armature and field in parallel and simultaneously establish a local circuit containing said resistance, field and armature in series and through which local circuit passes a counter current generated by the motor upon the assumption of increased speed of the armature.

6. In a motor control system, a motor having a rotatable armature and a stationary field, means to supply current to said armature and field in series, an electrical resistance and electrical means dependent upon the drop of current through the armature to automatically connect said armature and field in parallel and simultaneously establish a local circuit containing said resistance, field and armature in series and through which local circuit passes a counter current generated by the motor upon the assumption of increased speed of the armature.

7. In a motor control system, a motor having a rotating armature and a stationary field, means to supply current to the field and armature in series, a variable resistance and an automatically operated means dependent upon the speed of the armature to connect the armature and field in parallel and simultaneously supply a greater quantity of current to said field dependent upon said resistance.

In testimony that I claim the foregoing as my invention, I have signed my name in presence of two subscribing witnesses.

JOHN C. REED.

Witnesses:
 GEO. W. PARSONS,
 A. F. LEEDS.